(12) United States Patent
Peckham et al.

(10) Patent No.: US 8,677,354 B2
(45) Date of Patent: Mar. 18, 2014

(54) CONTROLLING KERNEL SYMBOL VISIBILITY AND ACCESSIBILITY ACROSS OPERATING SYSTEM LINKAGE SPACES

(75) Inventors: Stephen B. Peckham, Austin, TX (US); Donald R. Stence, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 12/834,337

(22) Filed: Jul. 12, 2010

(65) Prior Publication Data

US 2012/0011350 A1 Jan. 12, 2012

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | | | |
|---|---|---|---|---|
| 6,075,939 | A * | 6/2000 | Bunnell et al. | 717/107 |
| 6,889,167 | B2 * | 5/2005 | Curry, III | 702/183 |
| 6,959,262 | B2 * | 10/2005 | Curry, III | 702/183 |
| 7,293,200 | B2 * | 11/2007 | Neary et al. | 714/35 |
| 7,568,197 | B1 * | 7/2009 | Kiick et al. | 718/100 |
| 7,669,030 | B2 * | 2/2010 | Chittigala | 711/170 |
| 7,818,736 | B2 * | 10/2010 | Appavoo et al. | 717/168 |
| 8,321,876 | B2 * | 11/2012 | Lee et al. | 719/314 |
| 2003/0208492 | A1 * | 11/2003 | Winiger et al. | 707/100 |
| 2005/0028151 | A1 * | 2/2005 | Roth et al. | 717/162 |
| 2007/0036178 | A1 * | 2/2007 | Hares et al. | 370/490 |
| 2007/0134070 | A1 | 6/2007 | Smith et al. | |
| 2007/0136356 | A1 | 6/2007 | Smith et al. | |
| 2009/0183173 | A1 * | 7/2009 | Becker et al. | 719/313 |
| 2009/0217377 | A1 * | 8/2009 | Arbaugh et al. | 726/23 |

OTHER PUBLICATIONS

Xu et al. "Detecting Exploit Code Execution in Loadable Kernel Modules" 2004, 21 pages.*
Jones "Loadable Kernel Modules", Nov. 2001, pp. 43-49.*

* cited by examiner

*Primary Examiner* — Van Nguyen
(74) *Attorney, Agent, or Firm* — DeLizio Gilliam, PLLC

(57) ABSTRACT

A kernel extension associated with a first instance of an operating system can be detected. The kernel extension is configured to extend functionality of the kernel when loaded in a kernel managed by a second instance of the operating system. Some embodiments are further directed to detecting symbols for the kernel extension, where the symbols specify one or more functions associated with the kernel extension. Some embodiments are further directed to generating a first namespace that is assigned only to the first of the plurality of instances of the operating system. The first namespace is separate from a second namespace for the second of the plurality of the instances of the operating system. Some embodiments are further directed to storing the symbols in the first namespace.

25 Claims, 5 Drawing Sheets

CONTROLLING KERNEL SYMBOL VISIBILITY AND ACCESSIBILITY ACROSS OPERATING SYSTEM LINKAGE SPACES

BACKGROUND

Embodiments of the inventive subject matter generally relate to the field of operating systems, and, more particularly, to controlling kernel symbol visibility and accessibility across operating system linkage spaces.

Operating system virtualization is a technology that can divide a single host, such as a server, into multiple parts, or partitions, each running a separate instance, or image, of an operating system (OS). The instances of the operating systems are separate, or isolated, from each other in some ways. For example, the instances of the operating systems have separate file systems, separate users, separate applications, and separate processes. In other ways, however, the instances of the operating systems are not separate and can share some resources of the host. For example, the instances of the operating systems can share the memory, the kernel, the processors, the network cards, the hard drives, and/or other software, firmware, and/or hardware of the host. Thus, each instance of the operating system can look and feel like a separate server or machine from the point of view of its users. However, because the instances of the operating system share resources of the host, the instances of the operating systems are not actually separate devices. The instances of the operating system are commonly referred to as "virtual" or "virtualized" operating systems (virtual OS's). In similar contexts, virtualized operating systems are also referred to as virtual partitions, virtual machines, virtual environments, or virtual servers.

Virtual OS's can be implemented in different ways. One way is for an administrative user to create a logical partition (LPAR) on a host and install an instance of an operating system on the LPAR. The administrative user can create a logical partition (LPAR) by dividing a portion, or subset, of the host's hardware resources, such as processors, memory, and storage. The administrative user can isolate the LPAR from other LPARs running on the same device or machine. Specifically, the administrative user isolates the subset of the host's hardware resources from other subsets, so that multiple LPARs can run on the host, with each LPAR operating independently of each other, as if each LPAR was a separate machine. The administrative user can install an instance of the operating system on an LPAR. The instance of the operating system can run its own applications in a way that is separate and isolated from any other LPAR. The number of LPARs that can be created on a host, however, depends on the number of the host's resources available. For example, to create an LPAR, an administrative user must physically partition a portion of the host's memory and assign the portion of the host's memory to the LPAR. Because LPARs have separation at the hardware level, LPARs are very stable, can run different versions of an operating system, and provide a very high degree of isolation from other LPARs.

A different way to create a virtual OS is to form a workload partition (WPAR). WPARs were introduced in the IBM® AIX® 5.1 operating system. WPARs are a software implementation of operating system virtualization. More specifically, WPARs are software partitions that are created from, run under, and share the resources of a managing instance of the operating system (OS). The WPARs and the managing instance share an identical operating system (e.g., identical version, identical patches, identical tuning options, etc.). The managing instance of the OS may be referred to as a global environment or a global OS. Multiple WPARs can run on a single managing resource (e.g., on a single machine or on a single LPAR), which can all be managed by the global OS. An administrative user does not need to physically divide portions of the host's hardware to create a WPAR. Rather, the administrative user runs a command to generate a WPAR and the global OS creates and manages the WPAR as a software partition. Because WPARs are software implementations, WPARs can easily be migrated from one managing resource to another (e.g., from one LPAR to another or from one machine to another).

SUMMARY

Some embodiments include a method directed to detecting a kernel extension associated with a first of a plurality of instances of an operating system, where the kernel extension is configured to extend functionality of the kernel when loaded in a kernel managed by a second of the plurality of the instances of the operating system. In some embodiments, the second of the plurality of instances of the operating system manages the plurality of instances of the operating system. In some embodiments, the plurality of the instances of the operating system share the kernel. In some embodiments, the method is further directed to detecting symbols for the kernel extension, wherein the symbols specify one or more functions associated with the kernel extension. In some embodiments, the method is further directed to generating a first namespace that is assigned only to the first of the plurality of instances of the operating system, where the first namespace is separate from a second namespace for the second of the plurality of the instances of the operating system. In some embodiments, the method is further directed to storing the symbols in the first namespace.

Some embodiments include a computer program product for managing kernel extensions for one or more virtual operating systems. The computer program product can include a computer readable storage medium having computer readable program code embodied therewith. The computer readable program code can be configured to detect a kernel extension associated with a first of a plurality of instances of an operating system. In some embodiments, the kernel extension is configured to extend functionality of the kernel when loaded in a kernel managed by a second of the plurality of the instances of the operating system. In some embodiments, the second of the plurality of instances of the operating system manages the plurality of instances of the operating system. In some embodiments, the plurality of the instances of the operating system share the kernel. In some embodiments, the computer readable program code can further be configured to determine symbols for the kernel extension, wherein the symbols specify functions associated with the kernel extension. In some embodiments, the computer readable program code can further be configured to generate a first symbol table that is assigned only to the first of the plurality of instances of the operating system, where the first symbol table is separate from a second symbol table for the second of the plurality of the instances of the operating system. In some embodiments, the computer readable program code can further be configured to store the symbols in the first symbol table and not in the second symbol table.

Some embodiments are directed to an apparatus with a processing unit, a network interface, and a virtual operating system manager. In some embodiments, the virtual operating system manager is operable to, via the processing unit, detect a system call symbol for an application associated with a first of a plurality of instances of an operating system, where the system call symbol is associated with functionality of a kernel managed by a second of the plurality of the instances of the operating system. In some embodiments, the second of the plurality of instances of the operating system manages the plurality of instances of the operating system, and the plurality of the instances of the operating system share the kernel. In some embodiments, the virtual operating system manager is further operable to generate a first system call table that is assigned only to the first of the plurality of instances of the operating system, wherein the first system call table is separate from a second system call table for the second of the plurality of the instances of the operating system. In some embodiments, the virtual operating system manager is further operable to store the system call symbol in the first system call table and not in the second system call table.

Some embodiments include a computer program product for managing kernel extensions for one or more virtual operating systems. The computer program product can include a computer readable storage medium having computer readable program code embodied therewith. The computer readable program code can be configured to detect a system call request by a first of a plurality of instances of an operating system, where the system call request refers to a system call symbol associated with functionality of a kernel managed by a second of the plurality of the instances of the operating system. In some embodiments, the second of the plurality of instances of the operating system manages the plurality of instances of the operating system, and the plurality of the instances of the operating system share the kernel. In some embodiments, a first system call table is assigned to the first of the plurality of instances of the operating system, and a second system call table is assigned to the second of the plurality of instances of the operating system. In some embodiments, the computer readable program code can further be configured to detect a value associated with the system call request, where the value indicates to search the first system call table for the system call symbol. In some embodiments, the computer readable program code can further be configured to search the first system call table for the system call symbol.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
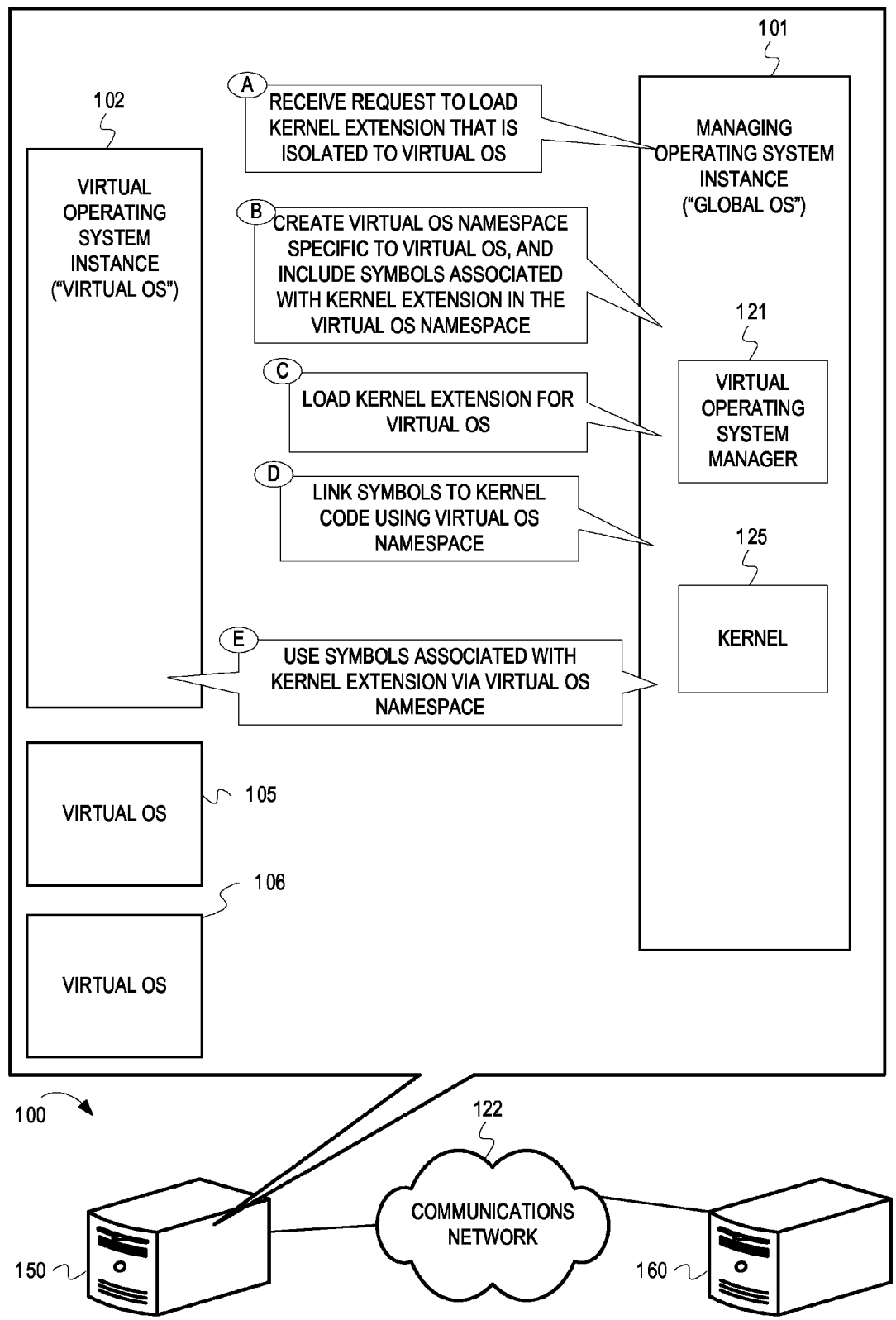
FIG. 1 is an example conceptual diagram of storing and linking kernel extension symbols in an independent and isolated namespace for a virtual operating system instance that loads the kernel extension.

The description that follows includes exemplary systems, methods, techniques, instruction sequences, and computer program products that embody techniques of the present inventive subject matter. However, it is understood that the described embodiments may be practiced without these specific details. For instance, although examples refer to virtual operating systems that are managed by a global operating system, other instances may include virtual operating systems managed by hypervisors, virtual machine monitors, LPARs, other virtual operating systems, some combinations therefore, etc. In other instances, well-known instruction instances, protocols, structures, and techniques have not been shown in detail in order not to obfuscate the description.

In some embodiments, a virtual OS shares a kernel with all other virtual OS's managed on a host. A global OS can provide kernel services and system calls for all the virtual OS's running on the host. To extend the functionality of a kernel, a kernel can receive kernel modules, or kernel extensions, that are not originally programmed into, or provided with, a default, or "base" kernel. A kernel extension is an object file that contains code to extend the base kernel of an operating system. Kernel extensions may also be known as Loadable Kernel Modules (LKMs), Kernel Loadable Modules (KLM) or Kernel Modules (KMOD). Kernel extensions are typically used to add support for new hardware and/or file systems, for extending a base kernels services (e.g., device driver management), for extending device drivers, for extending file systems, for adding system calls, etc. When the functionality provided by a kernel extension is no longer required, it can be unloaded in order to free memory. Without kernel extensions, an operating system would have to have all possible anticipated functionality already compiled directly into the base kernel. Much of that functionality would reside in memory without being used, wasting memory, and would require that users rebuild and reboot the base kernel every time new functionality is desired.

To date, however, only a global OS (i.e., a root user of the global OS) has had privileges to load any kernel extensions. Virtual OS's, or rather, root users of virtual OS's (e.g., WPARs) have not had privileges to load their own kernel extensions.

One of the reasons why virtual OS's have not had privileges to load their own kernel extensions is because if multiple virtual OS's exist on one global OS, and if one virtual OS loads a kernel extension, that kernel extension could conflict with other kernel extensions loaded by, or being used by, the other virtual OS's.

For example, if one virtual OS were granted privileges to load a kernel extension, the virtual OS administrator with privileges could potentially perform other activities in the kernel space that could interfere with the global OS, thus affecting all other virtual OS's running on the global OS. Even if the administrative user for the virtual OS were only granted privileges to load and unload kernel extensions, the administrative user could potentially load non-authorized kernel extensions or unload kernel extensions that were being shared by multiple virtual OS's, thus causing tremendous problems on the global OS.

In another example, if an administrator for a virtual OS loaded a kernel extension with a specific set of namespace symbols, the one virtual OS specific set of namespace symbols could conflict, or cause collisions, with other virtual partitions namespace symbols already loaded into a global namespace for the global OS. A namespace is an abstract container or environment created to hold a logical grouping of unique identifiers or symbols (e.g., names of system calls). A symbol defined in a namespace is associated with that namespace. When a kernel extension is loaded, it writes the unique symbols to the global namespace. If a virtual OS were allowed to load a kernel extension, then the unique symbols for that kernel extension could conflict with other already loaded unique symbols having the same name in the global namespace. To ensure that such conflicts did not occur, virtual OS's were not granted the privileges to load kernel extensions.

Some embodiments of the inventive subject matter, however, provide rights to a virtual OS to dynamically load and unload kernel extensions. To ensure that symbols for the loaded kernel extensions do not conflict (i.e., do not cause collisions), some embodiments create isolated namespaces for each virtual OS (referred to herein as local namespaces or virtual OS namespaces). In some embodiments, creating virtual OS namespaces can include creating separate symbol tables and separate system call tables for each virtual OS that loads a kernel extension. Some embodiments also present a layered approach for resolving symbols by accessing first a virtual OS namespace and, if symbols are not found, accessing a global namespace. Some embodiments also make system calls to virtual OS system call tables instead of, or in addition to, global system call tables. Some embodiments also enable a global system administrator to modify a set of exported kernel extensions at any time of the life cycle of the virtual OS. Thus, some embodiments can ensure that kernel extensions loaded by a virtual OS are private to the virtual OS and ensure that no data sharing of kernel extensions occurs between virtual OS and global OS space.

FIG. 1 is an example conceptual diagram of storing and linking kernel extension symbols in an independent and isolated namespace for a virtual operating system instance that loads the kernel extension. In FIG. 1, a virtual OS management system ("system") 100 includes one or more devices that are connected to each other, such as computers 150 and 160 that are connected by a communications network 122. Other embodiments, however, may include logical partitions instead of and/or in addition to, computers 150 and 160. Each of the connected devices may have one or more instances of operating systems installed on the devices. For example, computer 150 may have installed a first instance of an operating system 101. The first instance of the operating system 101 may also be referred to as a managing operating system instance, or "global OS" in some embodiments. The global OS 101 may include a virtual operating system manager 121 that manages multiple instances of virtual OS's that are installed on the devices (e.g., that are installed on one or more of the computers 150 and 160, that are installed on an LPAR, etc.). The global OS 101, for example, may manage a second instance of the operation system 102. The second instance of the operating system 102 is a virtual OS that is installed on one of the devices (e.g., on the computer 150), but that also shares resources of the device (e.g., shares resources of the computer 150 with other virtual OS's that may be running on the computer 150). The virtual operating system manager 121 is a module that can manage communications, activities, etc. for shared resources of the virtual OS's. For example, the virtual operating system manager 121 can control and manage use of a kernel 125 shared between multiple instances of operating systems (e.g., shared between the global OS 101, the virtual OS 102, and other virtual OS's 105 and 106 running on the computer 150).

In some embodiments, the virtual OS 102 has privileges to load kernel extensions to the kernel 125. For example, the virtual OS 102 requests to load a kernel extension (e.g., a kernel extension object file) that is isolated to the virtual OS (i.e., that is not shared with other virtual OS's 105 or 106). At stage "A," the global OS 101 receives the request and, at stage "B," and the virtual operating system manager 121 can create a virtual OS namespace, or in other words a namespace isolated to the virtual OS 102. In some embodiments, if the virtual OS namespace is already created (e.g., via loading of previous kernel extensions by the virtual OS 102), then the virtual operating system manager 121 can use or access components of the previously created virtual OS namespace. Also at stage "B," the virtual operating system manager 121 can include the symbols associated with, or provided by, the kernel extension in the virtual OS namespace. Then, at stage "C," the virtual operating system manager 121 can permit the virtual OS 102 to continue loading the kernel extension, which may include providing the kernel extension file to one or more components of the kernel 125 to load the kernel extension into kernel memory. At stage "D," the virtual operating system manager 121 can link the symbols in the virtual OS namespace to addresses in kernel memory for kernel code that performs functionality associated with the symbols. At stage "E," the virtual OS 102 and/or the global OS 101 (e.g., the kernel 125) use the symbols that access the functionality associated with the kernel extension, such as via one or more processes that request the extended services of the kernel 125 and/or that make and handle system calls associated with the extended services of the kernel 125. Thus, the system 100 can isolate namespaces for the virtual OS 102 from the global OS 101 and from namespaces for all other virtual OS on the system 100.

Figure 2:
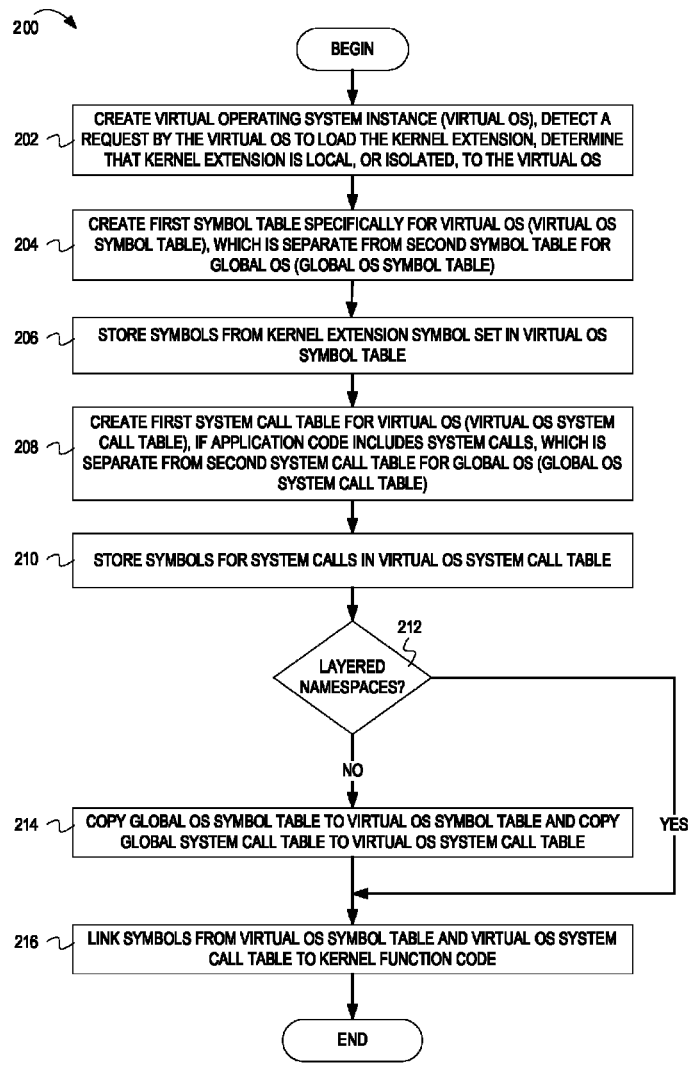
FIG. 2 is a flowchart depicting example operations for creating isolated virtual operating system namespaces for kernel extension symbols.

FIG. 2 is a flowchart depicting example operations for creating isolated virtual operating system namespaces for kernel extension symbols. For exemplary purposes, operations associated with FIG. 2 will be described as being performed by a virtual OS management system ("system"), such as by any or all of the elements described in FIG. 1 and/or FIG. 5. In FIG. 2, the system performs a flow 200.

Referring to FIG. 2, the system creates a virtual operating system instance (virtual OS), detects a request by the virtual OS to load the kernel extension, and determines that the kernel extension is local, or isolated, to the virtual OS (202). In some examples, kernel extensions can be global, or shared with other virtual OS's. In such examples, the system can store symbols in the global namespace and manage the symbols to be shared. However, some kernel extensions are not shared, but are local to the virtual OS. In some embodiments, the virtual OS's can request that a kernel extension be local.

Further, the system creates a first symbol table specifically for the virtual OS (a virtual OS symbol table), which is separate from a second symbol table for the global OS (a global OS symbol table) (204). The global OS has a symbol table for kernel symbols that are programmed into the base kernel managed by the global OS. The system, however, creates the virtual OS symbol table for the virtual OS, which is different from the global OS's symbol table. The system can store the virtual OS symbol table in kernel memory and can assign an identifier (e.g., a WPAR ID) to the virtual OS symbol table to indicate that the virtual OS symbol table belongs exclusively to the virtual OS and not to any other virtual OS.

The system stores symbols from a kernel extension symbol set in the virtual OS symbol table (206). The kernel extension includes a module that has a symbol set (kernel extension symbol set). The system accesses the kernel extension symbol set and writes entries in the virtual OS symbol table for each of the symbols in the kernel extension symbol set.

Further, the system can create a first system call table for the virtual OS (virtual OS system call table) if application code associated with the kernel extension includes system calls (208). The virtual OS system call table is separate from a second system call table that belongs to the global OS, (a global OS system call table). The system can also store the virtual OS system call table in kernel memory and can associate the system call table with the identifier for the virtual OS to indicate that the virtual OS system call table belongs exclusively to the virtual OS and not to any other virtual OS. In some embodiments, the system can analyze the application's code and determine whether the code specifies a potential system call that is specific to the virtual OS that the application may make at a future point. If the system finds such a system call in the code, the system can generate the virtual OS system call table. If, however, the system does not find a system call specific to the virtual OS, the system can refrain from creating the virtual OS system call table. Some kernel extensions do not need to use system calls (e.g., device drivers) and therefore, some embodiments may not create a virtual OS system call table.

The system can store symbols for the system calls in the virtual OS system call table (210).

Further, the system can determine whether to layer the virtual OS namespace with the global OS namespace (212). In other words, the system can determine to use both a virtual OS namespace and a global OS namespace for storing and using symbols for the virtual OS. The virtual OS namespace would include symbols from the kernel extension symbol set and the global OS namespace would include any global symbols. If the system does not to use a layered approach, or in other words, if the system does not use both a global OS namespace along with a virtual OS namespace for the virtual OS, the system can copy all global OS symbols, such as the symbols in the global symbol table and the global system call table, to the virtual OS symbol table and the virtual OS system call table (214). By copying the global OS symbol table and system call table to the virtual OS namespace, the virtual OS will have complete isolation because all use of symbols will only ever refer to the virtual OS namespace. Copying all global symbols to virtual OS namespace can require additional storage resources on a host especially if hundreds or thousands of virtual OS's were to each have a copy of all the global systems in their respective virtual OS namespaces. Further, accessing global symbols from virtual OS namespaces may introduce additional functions and/or activities for the system. However, having all symbols in virtual OS namespace provides greater isolation between virtual OS's. If, however, (at 212) the system determines to use a layered approach, the system does not copy the global OS symbols to the virtual OS namespace. The system, thus, will utilize a layered approach to find virtual OS specific symbols from the virtual OS namespace and global OS symbols from the global OS namespace. The system can also indicate (e.g., set an indicator), for the virtual OS, whether the virtual OS is using a layered or non-layered approach.

Further, the system can link symbols from the virtual OS symbol table and the virtual OS system call table to kernel function code (216). The system can include a linker or linkeditor to perform linkage. Symbols in the virtual OS symbol table and the virtual OS system call table would then only be available to processes for the virtual OS and not for any other virtual OS managed by the global OS.

Figure 3:
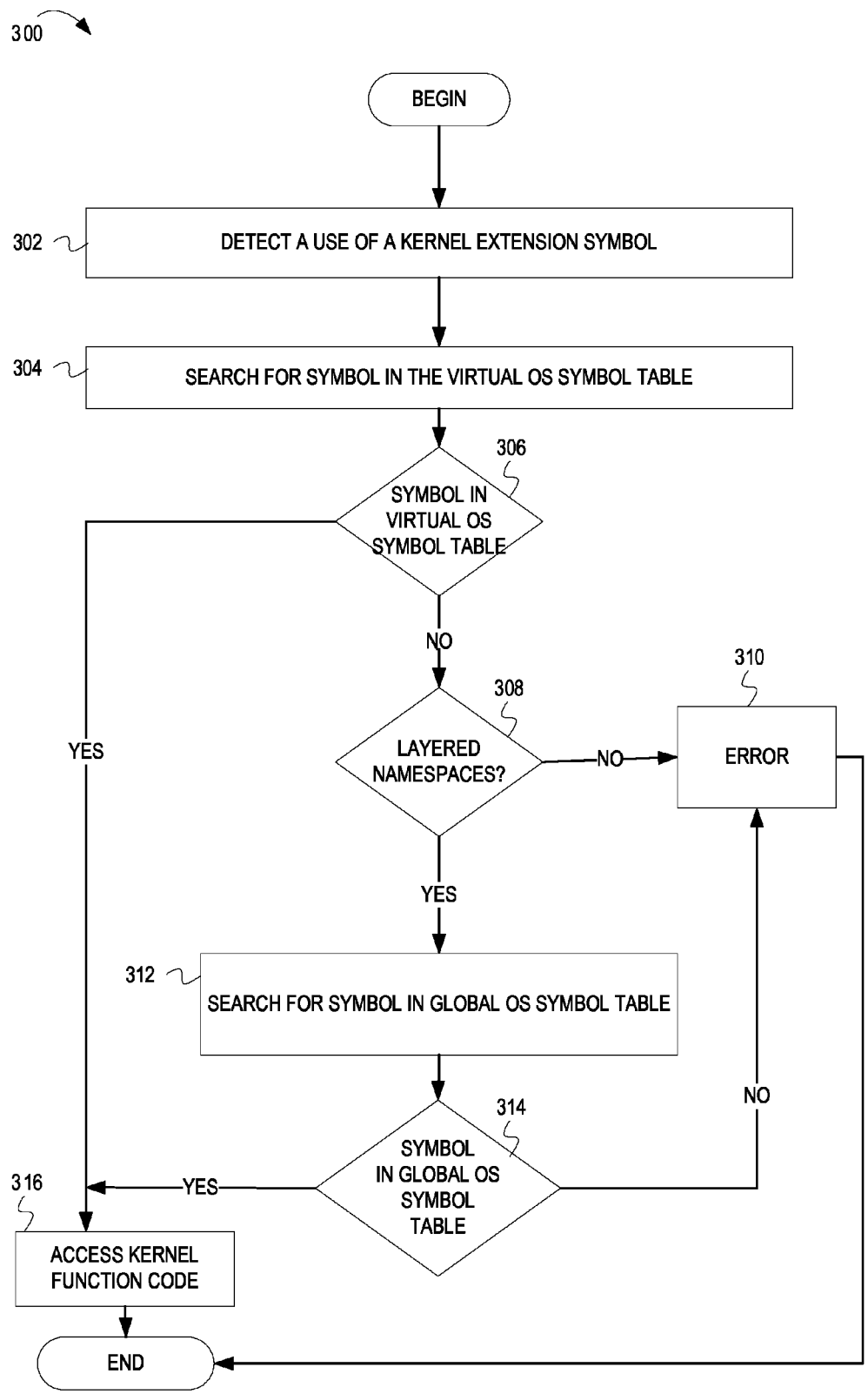
FIG. 3 is a flowchart depicting example operations for accessing kernel extension symbols in isolated virtual operating system namespaces.

FIG. 3 is a flowchart depicting example operations for accessing kernel extension symbols in isolated virtual operating system namespaces. For exemplary purposes, operations associated with FIG. 3 will be described as being performed by a virtual OS management system ("system"), such as by any or all of the elements described in FIG. 1 and/or FIG. 5. In FIG. 3, the system performs a flow 300.

Referring to FIG. 3, the system detects a use of (e.g., detects a call to, detects a request to access, etc.) a kernel extension symbol (302). The system can search for the kernel extension symbol ("symbol") in a virtual OS symbol table (304). The system can also determine whether the symbol is found in the virtual OS symbol table (306). If the symbol is not in the virtual OS symbol table, the system can determine whether the virtual OS is using layered namespaces (308). Specifically, the system can check an indication or indicator previously set (e.g., see above 212 in FIG. 2). If the system determines that the virtual OS is not using layered namespaces (e.g., all global symbols had been copied to the local OS namespace), then the system detects an error (310) and the process ends. If, however, the system determines that the virtual OS is using layered namespaces, the system searches for the symbol in the global OS symbol table (312) after searching for the symbol in the virtual OS symbol table. If the system does not find the symbol in the global OS symbol table, the system detects an error (310) and the process ends. If, however, the system finds the symbol in the virtual OS symbol table (306) or in the global OS symbol table (314), the system can use the symbol to access kernel code associated with (e.g., linked to) the symbol (316).

Figure 4:
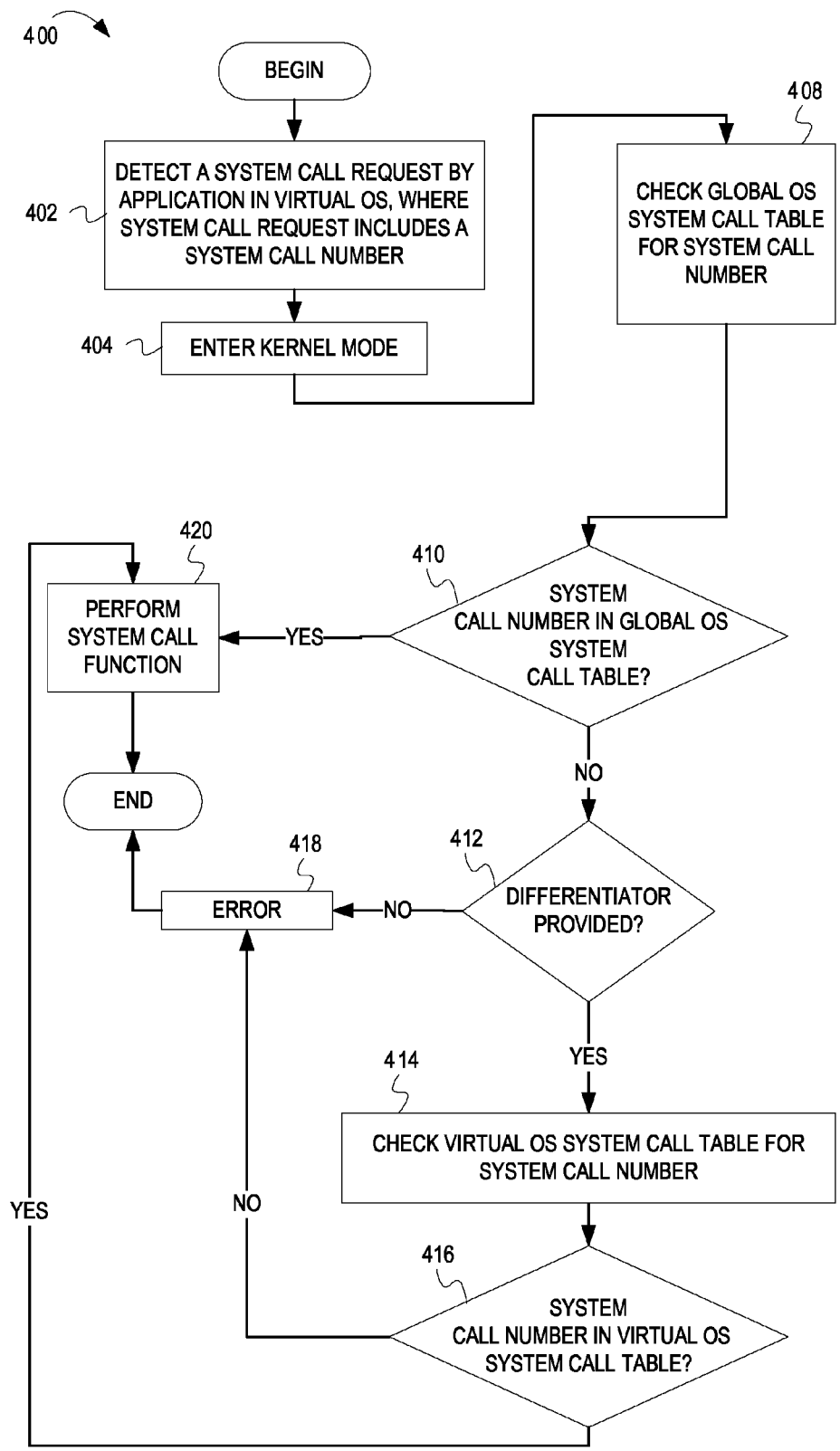
FIG. 4 is a flowchart depicting example operations for making system calls in isolated virtual operating system namespaces.

FIG. 4 is a flowchart depicting example operations for making system calls in isolated virtual operating system namespaces. For exemplary purposes, operations associated with FIG. 4 will be described as being performed by a virtual OS management system ("system"), such as by any or all of the elements described in FIG. 1 and/or FIG. 5. In FIG. 4, the system performs a flow 400.

Referring to FIG. 4, the system detects a system call request by an application in a virtual OS (402). The system call request can include a system call number. A system call request may provide a number value that includes the system call number. The system call request can also include arguments associated with the system call. The system call request can invoke a system call entry point function.

Upon receiving the system call request, the system can enter kernel mode (404) (e.g., via the system call entry point function).

After entering kernel mode, the system can check the global OS system call table (408) and determine whether the system call is in the global OS system call table (410). If the system call number is in the global OS system call table, the system can perform a system call function (420) using information from the global OS system call table. The system can also pass or use any arguments provided previously (e.g., at 402).

If, however, the system does not find the system call number in the global OS system call table, the system may, in some embodiments, enter an error path, or a portion of the flow 400 where the system may return an error if the system call is not found in the global OS system call table. The system can check to determine whether a differentiator, or indicator, has been set (412) which would indicate that the system call number is potentially in the virtual OS system call table. In some embodiments, a system loader that loads the kernel extension can set the differentiator. The differentiator can be a bit in a system call value associated with the system call request. The system call value can be a string of bits. A portion of the string of bits can include the system call number and a portion can be a differentiator bit (e.g., a high order bit, or a bit outside a range of potential system call numbers). When the differentiator bit is set, the system would know to search the virtual OS system call table for the system call number. The system can ignore, or remove, the differentiator bit upon entering kernel mode (404) and can store the differentiator bit until needed, for example, if the system call number is not found in the global OS system call table at 410. In some embodiments, the system does not look at the differentiator bit until the system has first looked at the global OS.

Because, in some embodiments, the check for the differentiator can be in the error path, the system can avoid having to perform a check to the virtual OS system call table before checking the global OS system call table. In other embodiments, however, the system can check for a differentiator immediately after entering kernel mode (404), and if the differentiator is set, the system can immediately check the virtual OS system call table (414) for the system call number.

If the differentiator is not set, the system can return an error (418) and end the flow 400. If, however, the differentiator is set, the system can check the virtual OS system call table for the system call number (414). After the system checks the virtual OS system call table (414), the system determines whether the system call number is in the virtual OS system call table (416). If the system finds the system call number in the virtual OS system call table, the system can perform the system call function (420) and pass or use any arguments provided previously (e.g., at 402).

In another embodiment, after entering kernel mode (e.g., at 402), the system can determine whether layered namespaces are being used (e.g., check a previously created indicator, for example, set at 212 of FIG. 2). If the system is not using layered namespaces, the system can check the virtual OS system call table (414) and determine whether the system call number is in the virtual OS (416) without having to check the global OS system call table. If, however, the system is using layered namespaces, the system can check the global OS system call table (408) and determine whether the system call is in the global OS system call table (410).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
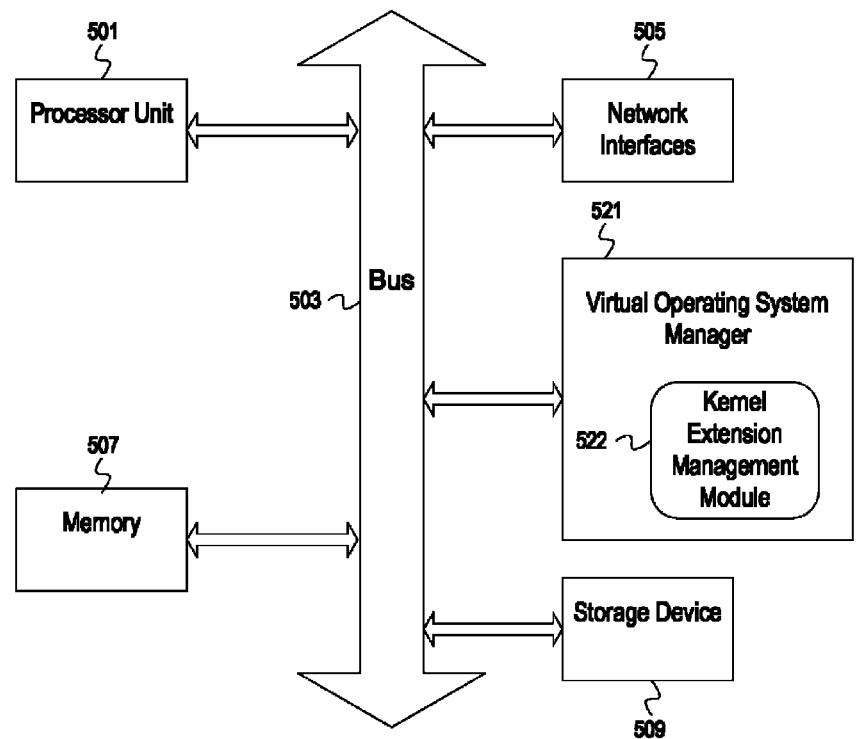
FIG. 5 depicts an example computer system.

FIG. 5 depicts an example computer system 500. The computer system 500 includes a processor unit 501 (possibly including multiple processors, multiple cores, multiple nodes, and/or implementing multi-threading, etc.). The computer system 500 includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 503 (e.g., PCI bus, ISA, PCI-Express bus, HyperTransport® bus, InfiniBand® bus, NuBus bus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system 500 also includes a virtual operating system manager 521. The virtual operating system manager 521 can manage resources of the computer system 500 that are shared between one or more instances of operating systems (i.e., virtual operating systems) that may run on, or that are controlled by, the computer system 500. The virtual operating system manager 521 can include individual components or parts that manage different aspects or parts of the virtual operating system and shared resources. For example, the virtual operating system manager 521 can include a kernel extension management module 522 that can manage symbols, linkage, and other aspects of symbol use and/or resolution in the process of configuring, loading and/or unloading of kernel extensions/modules by virtual operating systems. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for debugging workflows as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   detecting a kernel extension associated with a first of a plurality of instances of an operating system, wherein the kernel extension is configured to extend functionality of the kernel when loaded in a kernel managed by a second of the plurality of the instances of the operating system, wherein the second of the plurality of instances of the operating system manages the plurality of instances of the operating system, and wherein the plurality of the instances of the operating system share the kernel;
   detecting symbols for the kernel extension, wherein the symbols specify one or more functions associated with the kernel extension;
   generating a first namespace that is assigned only to the first of the plurality of instances of the operating system, wherein the first namespace is separate from a second namespace for the second of the plurality of the instances of the operating system; and
   storing the symbols in the first namespace.

2. The method of claim 1, further comprising:
   after detecting the kernel extension,
   determining that the kernel extension cannot be shared globally by the plurality of the instances of the operating system; and
   generating the first namespace in response to determining that the kernel extension cannot be shared globally by the plurality of the instances of the operating system.

3. The method of claim 1, wherein said generating the first namespace that is accessible only to the first of the plurality of instances of the operating system comprises:
   generating a first symbol table accessible only to the first of the plurality of instances of the operating system, wherein the first symbol table is separate from a second symbol table for the second of the plurality of instances of the operating system, and
   wherein said storing the symbols in the first namespace comprises storing the symbols in the first symbol table and not in the second symbol table.

4. The method of claim 1, wherein said generating the first namespace that is accessible only to the first of the plurality of instances of the operating system comprises:
   determining that one of the symbols is associated with a system call associated with the kernel extension; and
   creating a first system call table in response to detecting the system call symbol, wherein the first system call table is separate from a second system call table for the second of the plurality of the instances of the operating system, and wherein said storing the symbols in the first namespace comprises storing the one of the symbols in the first system call table.

5. The method of claim 4, further comprising:
   detecting a system call request by the first of the plurality of the instances of the operating system, wherein the system call request uses the one of the symbols;
   searching the second system call table for the one of the symbols, wherein said searching the second system call table fails to find the one of the symbols; and
   searching the first system call table subsequent to searching the second system call table.

6. The method of claim 4, further comprising:
   receiving a system call number from the first of the plurality of the instances of the operating system;
   searching the second system call table for the system call number, wherein said searching the second system call table fails to find the system call number;
   after searching the second system call table for the system call number, detecting an indicator value that indicates to search the first system call table; and
   searching the first system call table after detecting the indicator value.

7. The method of claim 6, wherein the system call number is stored in a bit string number value and wherein the indicator value is a bit in the bit string, wherein the bit in the bit string number value is a high-order bit beyond a range of potential system call numbers for one or more of the first of the plurality of the instances of the operating system.

8. The method of claim 6, further comprising;
finding the system call number in the first system call table; and
performing the system call function.

9. The method of claim 1, wherein said first of the plurality of the instances of the operating system is installed on a software partition and the second of the plurality of the instances of the operating system is installed on one or more of a logical partition and a server.

10. A computer program product for isolating namespaces for virtual operating systems, the computer program product comprising:
a non-transitory computer readable storage medium having computer readable program code embodied therewith, the computer readable program code comprising:
computer readable program code configured to,
detect a kernel extension associated with a first of a plurality of instances of an operating system, wherein the kernel extension is configured to extend functionality of the kernel when loaded in a kernel managed by a second of the plurality of the instances of the operating system, wherein the second of the plurality of instances of the operating system manages the plurality of instances of the operating system, and wherein the plurality of the instances of the operating system share the kernel,
determine symbols for the kernel extension, wherein the symbols specify functions associated with the kernel extension,
generate a first symbol table that is assigned only to the first of the plurality of instances of the operating system, wherein the first symbol table is separate from a second symbol table for the second of the plurality of the instances of the operating system, and
store the symbols in the first symbol table and not in the second symbol table.

11. The computer program product of claim 10, said computer readable program code being further configured to,
determine that the kernel extension is exclusive to the first of the plurality of the instances of the operating system, and
copy additional symbols from the second symbol table to the first symbol table.

12. The computer program product of claim 10, said computer readable program code being further configured to,
link the symbols to kernel code,
detect a use, by the first of the plurality of the instances of the operating system, of one of the symbols, and
search the first symbol table and not the second symbol table for the one of the symbols.

13. The computer program product of claim 10, said computer readable program code configured to,
determine that one of the symbols is associated with a system call associated with the kernel extension,
create a first system call table in response to determining that the one of the symbols is associated with the system call associated with the kernel extension, wherein the first system call table is separate from a second system call table for the second of the plurality of the instances of the operating system, and
store the one of the symbols in the first system call table.

14. The computer program product of claim 13, said computer readable program code being further configured to detect a system call request that uses the one of the symbols, wherein the system call request is by the first of the plurality of the instances of the operating system,
search the second system call table for the one of the symbols, wherein said searching the second system call table fails to find the one of the symbols in the second system call table, and
search the first system call table subsequent to searching the second system call table.

15. The computer program product of claim 14, said computer readable program code being further configured to
detect a system call request that uses the one of the symbols by the first of the plurality of the instances of the operating system, and
search the first system call table for the one of the symbols and not search the second system call table.

16. The computer program product of claim 10, wherein said first of the plurality of the instances of the operating system is installed on a software partition and the second of the plurality of the instances of the operating system is installed on one or more of a logical partition and a computer.

17. An apparatus comprising:
a processor;
a network interface; and
a computer readable storage medium having computer usable program code embodied therewith, the computer usable program code executable by the processor to cause the apparatus to,
detect a system call symbol for an application associated with a first of a plurality of instances of an operating system, wherein the system call symbol is associated with functionality of a kernel managed by a second of the plurality of the instances of the operating system, wherein the second of the plurality of instances of the operating system manages the plurality of instances of the operating system, and wherein the plurality of the instances of the operating system share the kernel,
generate a first system call table that is assigned only to the first of the plurality of instances of the operating system, wherein the first system call table is separate from a second system call table for the second of the plurality of the instances of the operating system, and
store the system call symbol in the first system call table and not in the second system call table.

18. The apparatus of claim 17, wherein the computer usable program code is executable by the processor to further cause the apparatus to:
detect a system call request by the first of the plurality of the instances of the operating system, wherein the system call request uses the system call symbol,
search the second system call table for the system call symbol, wherein said searching the second system call table fails to find the system call symbol, and
search the first system call table for the system call symbol subsequent to searching the second system call table.

19. The apparatus of claim 17, wherein the computer usable program code is executable by the processor to further cause the apparatus to:
receive a system call number from the first of the plurality of the instances of the operating system,
search the second system call table for the system call number, wherein said searching the second system call table fails to find the system call number,
after searching the second system call table for the system call number, detect an indicator value that indicates to search the first system call table, and search the first system call table after detecting the indicator value.

20. The apparatus of claim 17, wherein the system call number is stored in a bit string number value and wherein the indicator value is a bit in the bit string, wherein the bit in the bit string number value is a high-order bit beyond a range of potential system call numbers for one or more of the first of the plurality of the instances of the operating system and the second of the plurality of the instances of the operating system.

21. A computer program product for making system calls for virtual operating systems, the computer program product comprising:
a non-transitory computer readable storage medium having computer readable program code embodied therewith, the computer readable program code comprising:
computer readable program code configured to,
detect a system call request by a first of a plurality of instances of an operating system, wherein the system call request refers to a system call symbol associated with functionality of a kernel managed by a second of the plurality of the instances of the operating system, wherein the second of the plurality of instances of the operating system manages the plurality of instances of the operating system, wherein the plurality of the instances of the operating system share the kernel, wherein a first system call table is assigned to the first of the plurality of instances of the operating system, and wherein a second system call table is assigned to the second of the plurality of instances of the operating system,
detect a value associated with the system call request, wherein the value indicates to search the first system call table for the system call symbol, and
search the first system call table for the system call symbol.

22. The computer program product of claim 21, said computer readable program code being further configured to
search the second system call table for the system call symbol before searching the first system call table and before detecting the value associated with the system call request,
determine that the system call symbol is not in the second system call table in response to searching the second system call table, and
search the first system call table for the system call symbol in response to detecting the value associated with the system call and in response to determining that the system call symbol is not in the second system call table.

23. The computer program product of claim 21, said computer readable program code being further configured to
refrain from searching the second system call table for the system call symbol in response to detecting the value associated with the system call request.

24. The computer program product of claim 21, said computer readable program code being further configured to
generate the first system call table before detecting the system call request by the first of the plurality of instances of the operating system, wherein the first system call table is private to the first of the plurality of instances of the operating system, wherein the first system call table is separate from the second system call table for the second of the plurality of the instances of the operating system, and
store the system call symbol in the first system call table and not in the second system call table.

25. The computer program product of claim 21, wherein the system call number is stored in a bit string number value and wherein the indicator value is a bit in the bit string, wherein the bit in the bit string number value is a high-order bit beyond a range of potential system call numbers for one or more of the first of the plurality of the instances of the operating system and the second of the plurality of the instances of the operating system.

* * * * *